(12) United States Patent
Oakley

(10) Patent No.: US 6,926,459 B1
(45) Date of Patent: Aug. 9, 2005

(54) TUBING CONNECTOR

(76) Inventor: Raymond Oakley, 10842 Noel St. #101, Los Alamitos, CA (US) 90720

( * ) Notice: Subject to any disclaimer, the term of this patent is extended or adjusted under 35 U.S.C. 154(b) by 0 days.

(21) Appl. No.: 10/803,450

(22) Filed: Mar. 19, 2004

(51) Int. Cl.[7] .............................................. F16B 39/04
(52) U.S. Cl. ...................................... 403/290; 403/289
(58) Field of Search ............................... 403/231, 382, 403/403, 230, 2, 256, 290, 289

(56) References Cited

U.S. PATENT DOCUMENTS

| | | | |
|---|---|---|---|
| 3,008,741 A | | 12/1958 | MacCormack |
| 3,545,625 A | | 12/1970 | MacMillan |
| 3,580,620 A | * | 5/1971 | Offenbroich ................ 403/329 |
| 3,620,558 A | * | 11/1971 | MacMillan et al. ......... 403/290 |
| 4,086,946 A | * | 5/1978 | Keen .......................... 411/279 |
| 4,252,458 A | * | 2/1981 | Keen .......................... 403/287 |
| 4,585,210 A | * | 4/1986 | Adams ........................ 251/214 |

* cited by examiner

*Primary Examiner*—John R. Cottingham
(74) *Attorney, Agent, or Firm*—Edgar W. Averill, Jr.; Kenneth L. Green

(57) ABSTRACT

A fitting for releasably constructing a structure from tubing. The structure may be a machine housing providing safety during machine operation, which housing requires removal for machine maintenance. The fitting includes a corner piece and at least two arms extending from the corner piece, each arm having a central axis and an outwardly extending slice through the arm separating a distal end of each arm into a first finger portion and a second finger portion. A threaded hole orthogonal to the central axis and centered on the slice, has tapered threads. A screw resides in the threaded hole, wherein the screw and threaded hole have cooperating threads (e.g., cooperating tapered threads). A tubing end is slid over the arm, and includes an access opening allowing access to the screw. The screw may be advanced into the threaded hole, thereby spreading the finger portions and locking the tubing on the arm.

20 Claims, 7 Drawing Sheets

TUBING CONNECTOR

BACKGROUND OF THE INVENTION

The present invention relates to a tubing connector and more particularly to a releasable connector suitable for constructing enclosures for machinery.

Various machinery requires both a safety enclosure to prevent injury during operation, and periodic maintenance. While it is known to construct such enclosures, there has been a conflict between building a strong structure and building a structure that allowed easy disassembly for maintenance.

U.S. Pat. No. 3,008,741 issued Nov. 14, 1961 for "Structural Apparatus," describes a corner fitting suitable for assembling a cabinet. The corner piece includes at least two arms which are insertable into the ends of square tubing. The arm defines a longitudinal diagonal slice separating the end of each arm into a first triangular portion and a second triangular portion. A diagonal screw in the first triangular portion is accessed through a hole in the corresponding tubing. The end of the screw abuts the second triangular portion and tightening the screw spreads the triangular portions apart, thereby creating a friction fit between the arm and the tubing. Although the apparatus of the '741 patent appears to provide a strong and easily assembleable and disassembleable tubing connector, repeated assembly and disassembly causes the screw to become loose, and eventually wears out the fitting.

U.S. Pat. No. 3,545,625 issued Dec. 8, 1970 for "Modular Construction Frame," describes a corner fitting similar to the fitting of the '741 patent, the difference being that the fitting of the '625 patent includes slices forming an inverted "T" (contrasted to the diagonal slice of the '714 patent), and the screw includes a tip intercepting the "T", and forcing the slices to separate. Repeated assembly and disassembly of the '625 fitting also causes wear of the fitting.

Other fittings have used plastic mating surfaces, but have not provided the combination of strength and repeated assembly and disassembly desired. The plastic mating surfaces make disassembly and re-use very difficult or impossible because of the binding the plastic fitting and the interior of the tubing.

BRIEF SUMMARY OF THE INVENTION

The present invention addresses the above and other needs by providing a fitting suitable for repeatedly and releasably constructing a structure from tubing. The structure may be a machine housing providing safety during machine operation, which housing often requires removal for machine maintenance. The fitting includes a corner piece and at least two arms extending from the corner piece, each arm having a central axis and an outwardly extending slice through the arm separating a distal end of each arm into a first finger portion and a second finger portion. A threaded hole is orthogonal to the central axis and is centered on the slice, and has tapered threads. A screw resides in the threaded hole, wherein the screw and threaded hole have cooperating tapered threads (e.g., cooperating National Pipe Tapered (NPT) threads). A tubing end is slid over the arm, which tubing end includes an access opening which allows access to the screw. The screw may then be advanced into the threaded hole, thereby spreading the first and second finger portions and locking the tubing on the arm.

In accordance with one aspect of the invention, there is provided a releasable tubing connector comprising a corner piece and at least one arm attached to the corner piece at a proximal end of the arm and extending away from the corner piece, and having a distal end opposite the proximal end. The arm has a central axis extending through the center of the arm and away from said corner piece. A slice extends from the distal end of the arm toward the proximal end and separates the distal end of the arm into a first finger portion and a second finger portion. A taper threaded hole is centered on the slice and orthogonal to the central axis. The arm may be slid into an end of the tubing, and a tapered screw may be advanced into the taper threaded hole to spread the first finger portion of the arm from the second finger portion of the arm to secure the tubing on the tubing connector.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
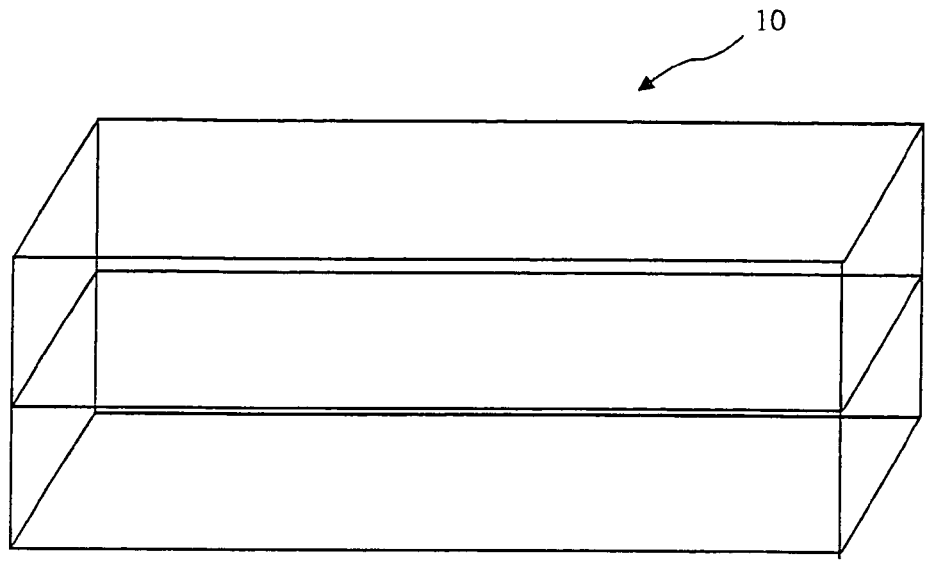
FIG. 1 is a structure constructed from tubing
Figure 2:
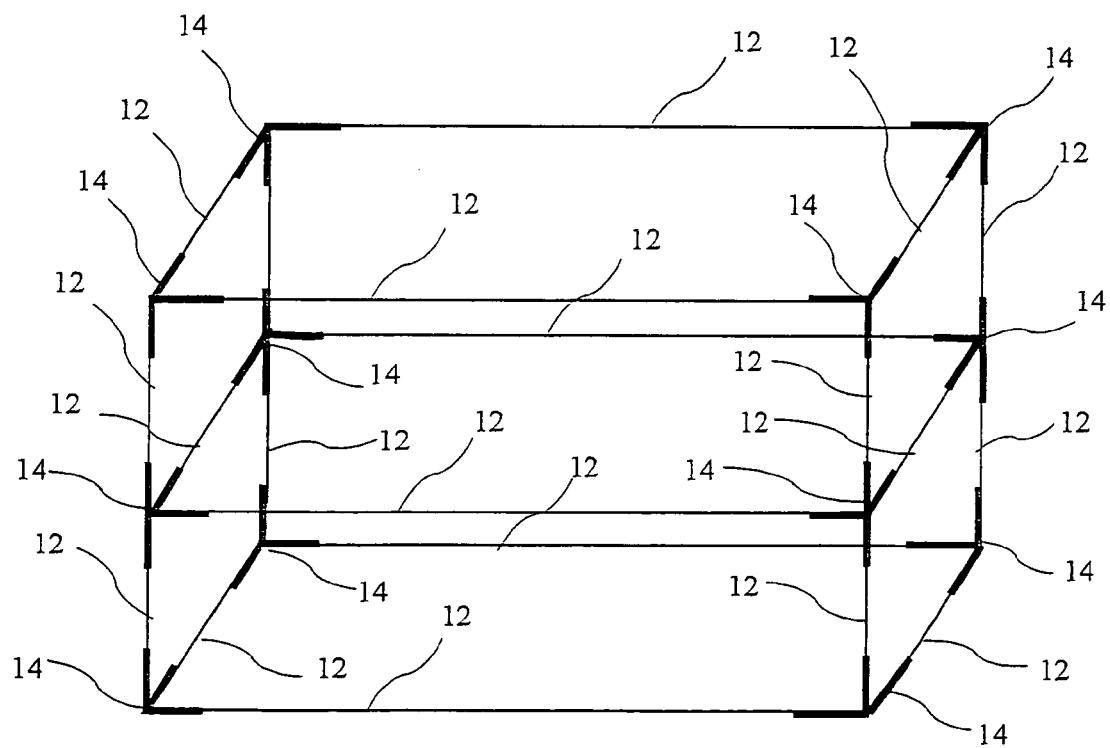
FIG. 2 shows tubing and tubing connectors used to construct a structure.

Various structures 10 are often constructed from tubing as shown in FIG. 1. Such structure 10 may be for storage, for display, for creating a protective enclosure over machinery, or many other uses. The structure 10 may be made by permanently connecting tubing, or in some cases when occasional or periodic disassembly is required, may be constructed using releasable tubing connectors. An example of a combination of tubing segments 12 and tubing connectors 14 to build a structure is shown in FIG. 2.

Figure 3:
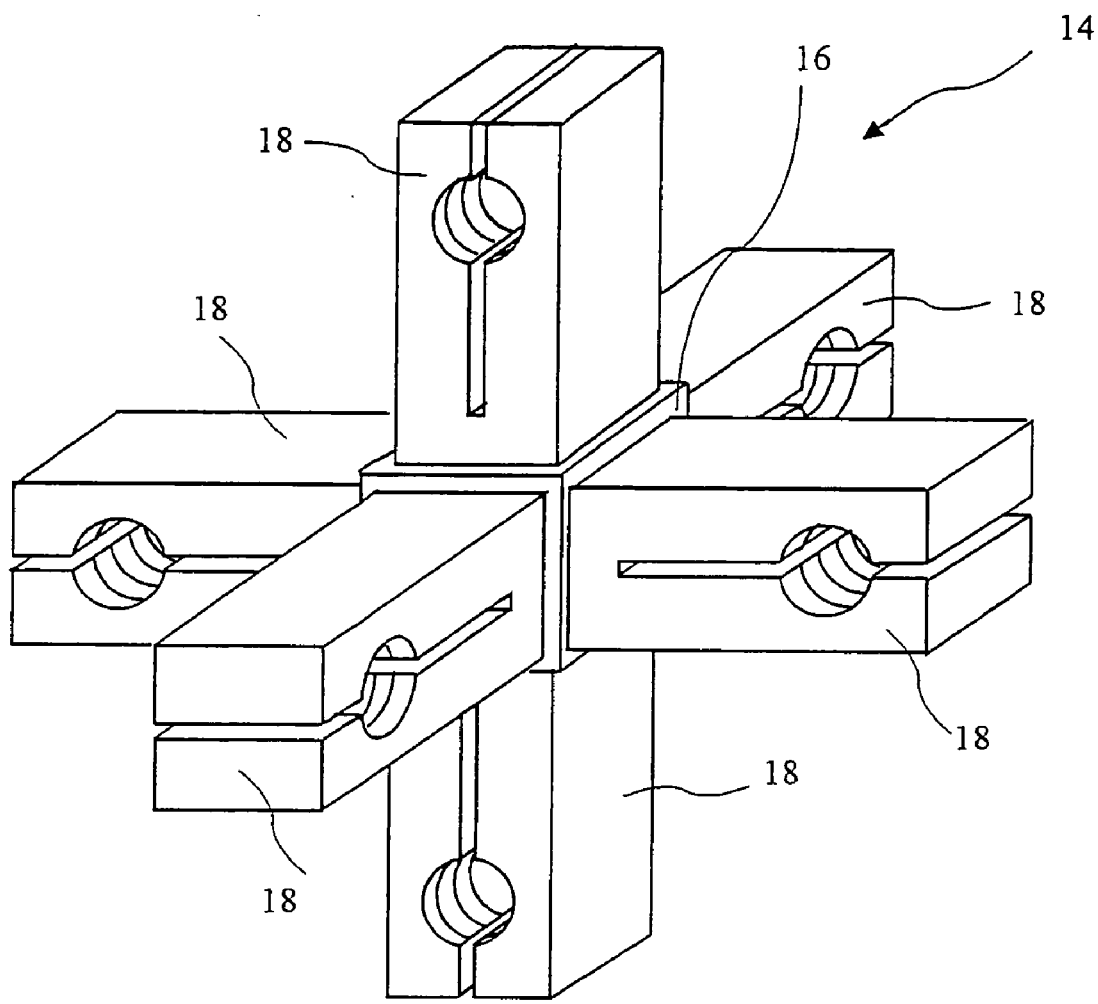
FIG. 3 shows a detailed view of a tubing connector according to the present invention.

A detailed example of a releasable tubing connector 14 according to the present invention is shown in FIG. 3. The tubing connector 14 comprises a corner piece 16 and at least one arm 18, and generally between one and six arms 18. The corner piece 16 is preferable substantially cube shaped (e.g., may have beveled or rounded edges). The arms 18 preferably have a substantially square cross-section (e.g., may have beveled or rounded edges,) and is suitable for cooperation with square tubing, but may have other cross-sections for use with other tubing types (e.g., round tubing, oval tubing, hexagonal tubing, and the like.)

Figure 4:
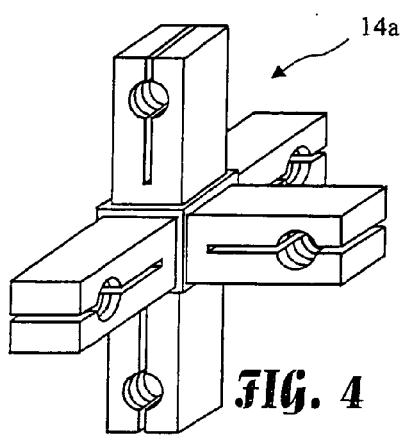
FIG. 4 shows a tubing connector having five arms according to the present invention.
Figure 5:
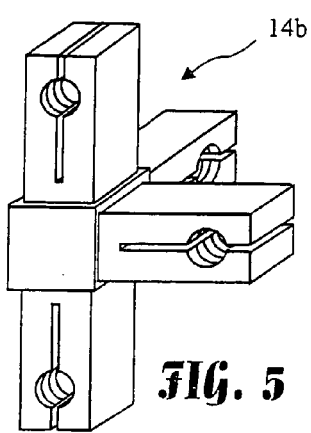
FIG. 5 shows a tubing connector having four arms according to the present invention.
Figure 6:
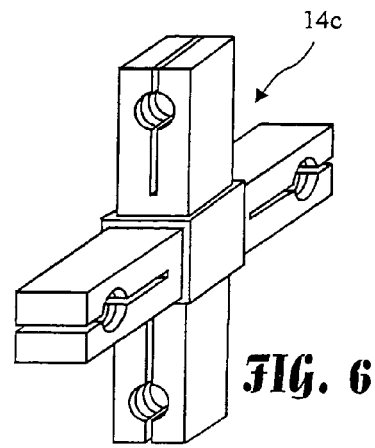
FIG. 6 shows a second tubing connector having four arms according to the present invention.
Figure 7:
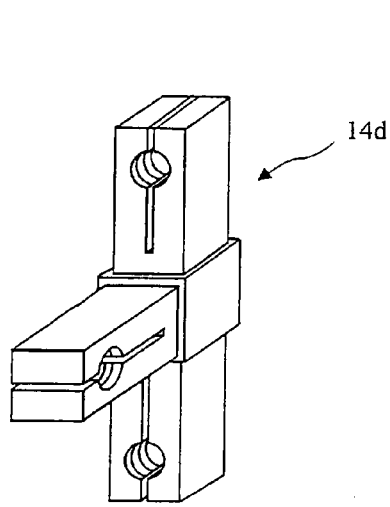
FIG. 7 shows a tubing connector having three arms according to the present invention.
Figure 8:
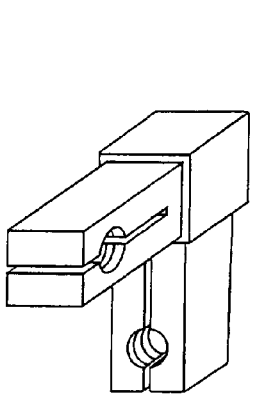
FIG. 8 shows a tubing connector having two arms according to the present invention.
Figure 9:
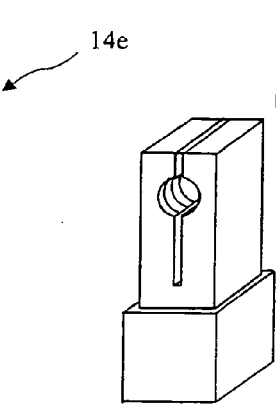
FIG. 9 shows a tubing end having one arm according to the present invention.
Figure 10:
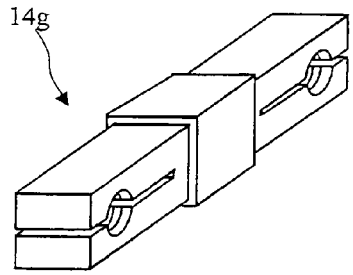
FIG. 10 shows a second tubing connector having two arms according to the present invention.

A second tubing connector 14a having five arms is shown in FIG. 4, a third tubing connector 14b having four arms is shown in FIG. 5, a fourth tubing connector 14c also having four arms is shown in FIG. 6, a fifth tubing connector 14d having three arms is shown in FIG. 7, a sixth tubing connector 14e having two arms is shown in FIG. 8, a seventh tubing connector 14f suitable for use as a tubing end having one arm is shown in FIG. 9, and an eighth tubing connector 14g having two arms is shown in FIG. 10.

Figure 11:
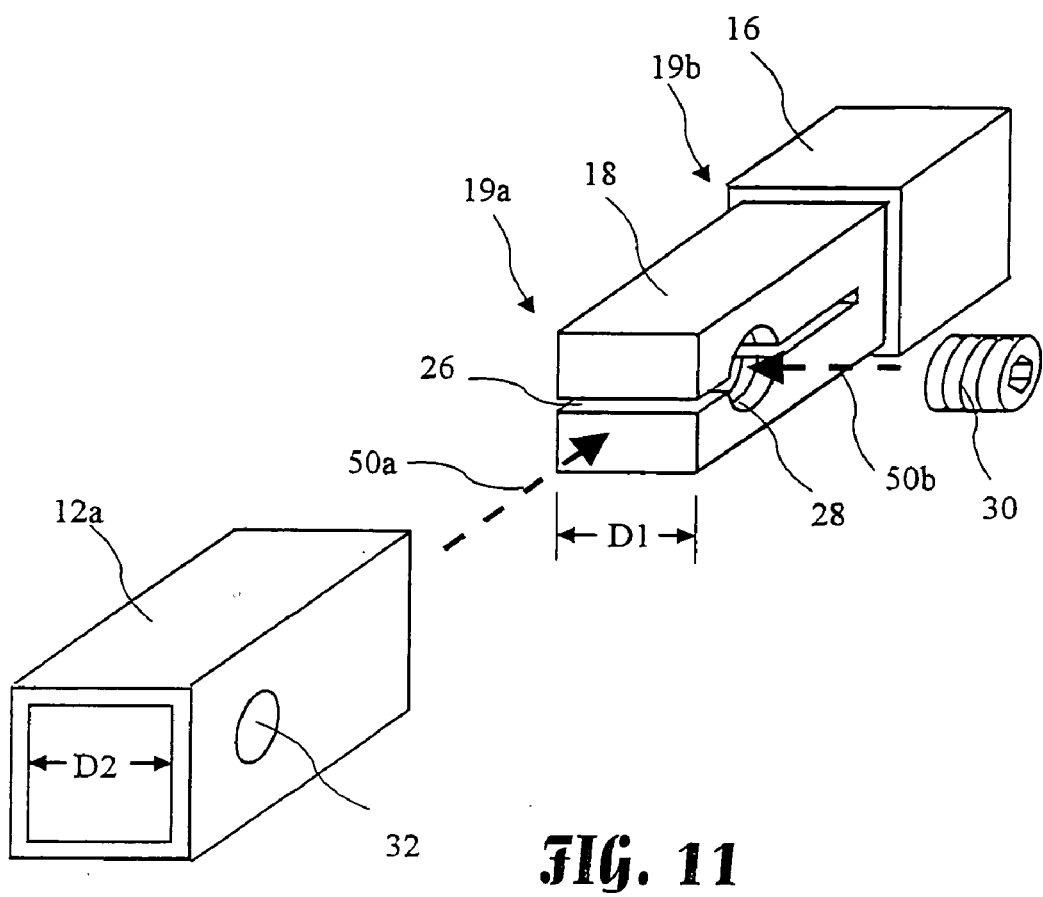
FIG. 11 depicts the cooperation of a tubing end with a tubing connector according to the present invention.

The cooperation of a tubing end 12a with the arm 18 is depicted in FIG. 11. The arm 18 is attached to the corner piece 16 at a proximal end 19b of the arm 18. The arm 18 has a slice running through a portion of the length of the arm 18 to a distal end 19a of the arm 18, and a tapered threaded hole 28 is substantially centered on the slice 26. The tubing end 12a may be advanced over the arm 18 along a first arrow 50a. The tubing end 12a includes an access hole 32.

Figure 12:
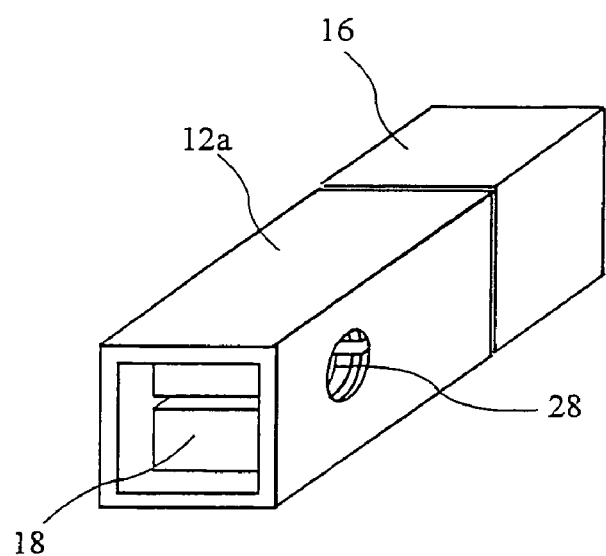
FIG. 12 shows a tubing end on a tubing connector according to the present invention.

The tubing end 12a is shown residing on the arm 18 in FIG. 12. The access hole 32 is aligned with the tapered threaded hole 28. Thus positioned, the screw 30 may be advanced into the threaded hole 28 using a tool inserted through the access hole 32.

The arm 18 is preferably between approximately 1.5 inches and approximately 2.5 inches long, and is more preferably approximately two inches long. The slice 20 is preferably between approximately 1.5 inches long and approximately 1.875 inches long, and is more preferably approximately 1.75 inches long. Alternatively, the slice 26 is preferably about 0.25 inches shorter than the arm 18. The arm 18 is preferably square and has an outside dimension D1 preferably between approximately 0.8 inches and approximately one inch across, and more preferably approximately 0.865 inches across. The tubing end 12a is preferably square and has an inside dimension D2 which is preferably approximately 0.885 inches. The above dimensions are for a tubing connector used with a typical one inch square tubing. Other tubing connectors according to the present invention are anticipated for use with other tubing sizes wherein D1 is preferably between approximately 0.015 and approximately 0.025 inches less than D2, and more preferably D1 is approximately 0.020 inches less than D2.

Figure 13A:
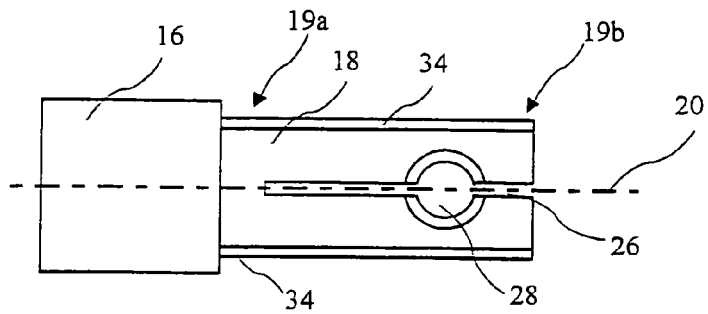
FIG. 13A shows a detailed side view cross-section of the tubing connector according to the present invention.
Figure 13B:
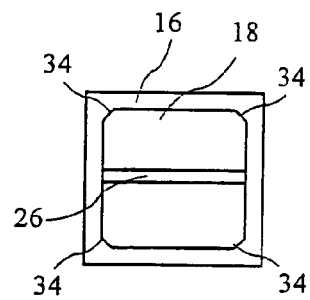
FIG. 13B shows a detailed end view cross-section of the tubing connector according to the present invention.
Figure 13C:
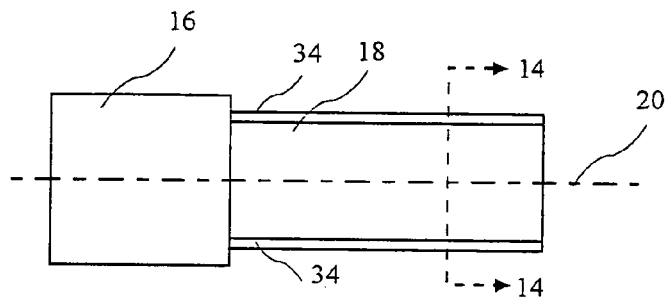
FIG. 13C shows a detailed top view cross-section of the tubing connector according to the present invention.

A side view of the arm 18 is shown in FIG. 13A, an end view in FIG. 13B, and a top view n FIG. 13C. An arm central axis 20 runs the length of the arm 18, and the slice 26 is substantially centered on the central axis 20. Each of the four edges of the arm 18 have a bevel 34, which bevel 34 is preferably one sixteenth inch (i.e., the bevels 34 cut one sixteenth of an inch into two perpendicular faces of the arm 18.) The faces.

Figure 14:
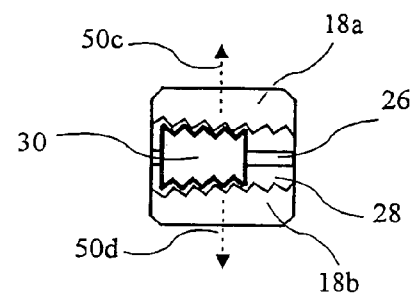
FIG. 14 shows a cross-sectional view taken along line 14—14 of FIG. 13C, of the cooperation of a screw with a threaded hole of the tubing connector according to the present invention.

A cross-sectional view taken along line 14—14 of FIG. 13C showing the screw 30 in the threaded hole 28 is shown in FIG. 14. The threaded hole 28 has a tapered thread, and preferably a National Pipe Tapered (NPT) thread. As a result, as the screw 30 is advanced into the threaded hole 28, the arm finger portions 18a, 18b are forced to separate along the slice 26, in directions shown by arrows 50c, 50d. The threaded hole 28 is centered on the slice 26, with sufficient precision so that the finger portions 18a, 18b freely separate when the screw 30 is advanced into the threaded hole 28. While such separation is achievable with a straight screw 30 and tapered threaded hole 28, the screw 30 preferably has a tapered thread matching the tapered threads of the threaded hole 28, and more preferably, the screw 30 has NPT threads matching the NPT threads of the threaded hole 28.

Figure 15:
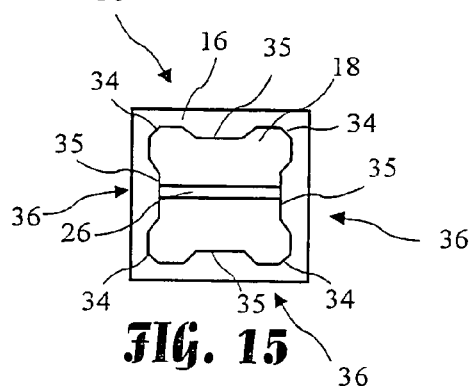
FIG. 15 shown an arm with reliefs in each face of the arm.

A preferred embodiment of the tubing connector 14 including reliefs 35 on each face 36 of the arm 18 is shown in FIG. 15. The reliefs 35 are preferably approximately 0.03125 inches deep and 0.375 inches wide for use with one inch square tubing. Reliefs on tubing connectors used with other size tubing preferably come within approximately 0.25 inches of the corner of the arms (ignoring any bevel).

Figure 16A:
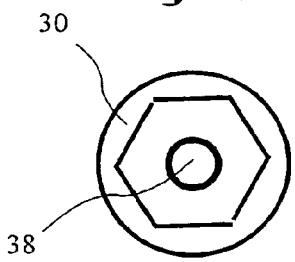
FIG. 16A shows an end view of the screw according to the present invention.
Figure 16B:
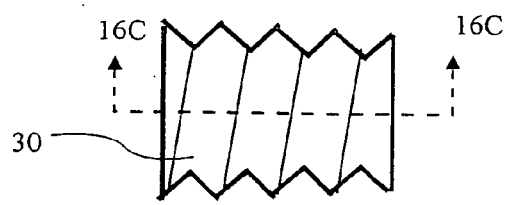
FIG. 16B shows a side view of the screw according to the present invention.
Figure 16C:
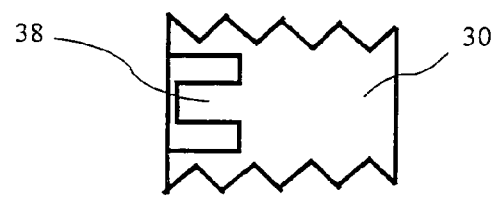
FIG. 16C shows a cross-sectional view taken along line 16C—16C of FIG. 16B of the screw with a set screw pin providing tramper resistance.

An end view of a tamper-resistant embodiment of the screw 30 is shown in FIG. 16A, and a side view in FIG. 16B. A cross-sectional view taken along line 16C—16C of FIG. 16B is shown in FIG. 16C. In uses where tampering, damage, injury, or theft may be an issue, the screw 30 may be a tamper-resistant fastener, and more preferably a pinned set screw. A set screw pin 38 is shown in end view in FIG. 16A, and in side view in FIG. 16C, which set screw pin 38 provides a tamper-resistant feature to the screw 30.

Figure 17:
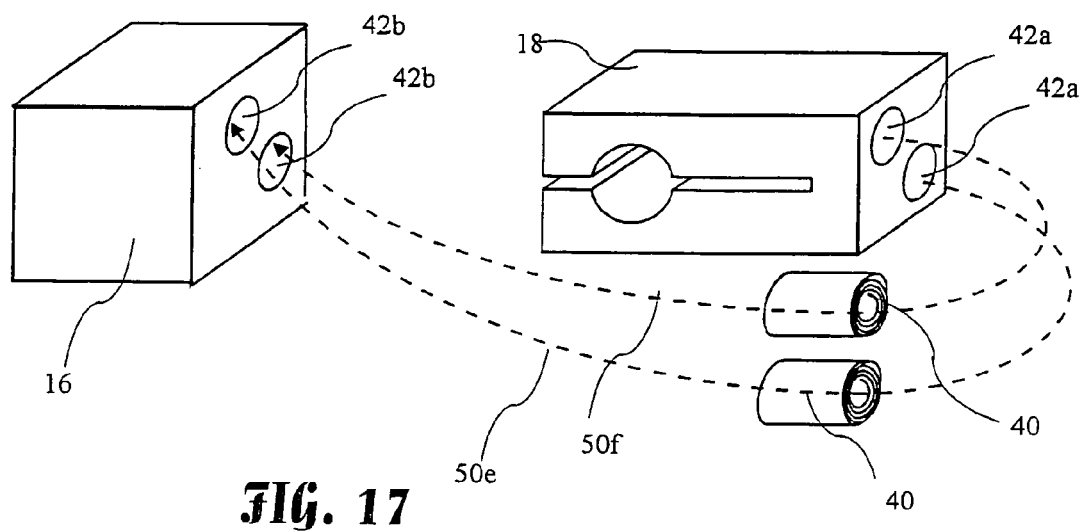
FIG. 17 depicts the construction of the tubing connector according to the present invention.

A structure and method of attaching the arm 18 to the corner piece 16 is shown in FIG. 17. Pins 40 are inserted into holes 42a in the arm 18 and into second holes 42b in the corner piece 16, wherein the arm 18 is advanced along arrows 50e, 50f to connect with the corner piece 16. The pins 40 are preferably coiled spring pins 40 made from stainless steel, and are preferably about ¼ inches in diameter about one inch long. Alternatively, dowel pins may be used to attach the arm 18 to the corner piece 16.

Figure 18:
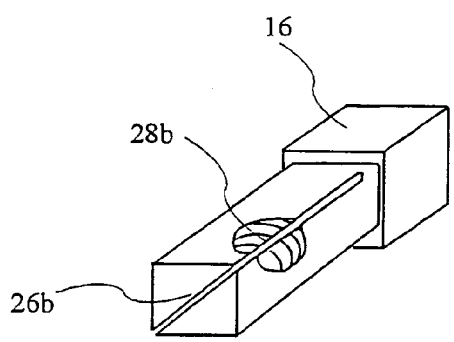
FIG. 18 shows a tubing connector having a diagonal slice and threaded hole according to the present invention.

A tubing connector with a diagonal threaded hole 28b and diagonal slice 26b is shown in FIG. 18. Although either a horizontal (or vertical) or a diagonal slice is an intuitive design selection, the slice may be at any angle relative to the arm, and any tubing connector with a taper thread used to expand finger portions of the arm with the slice at any angle is intended to come within the scope of the present invention.

Figure 19:
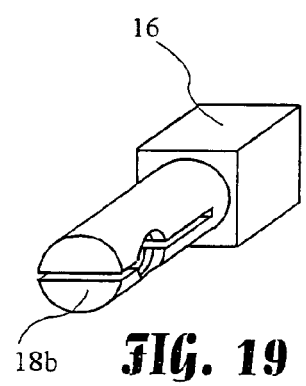
FIG. 19 shows a tubing connector having a round arm according to the present invention.

A tubing connector with a round arm 18b is shown in FIG. 19, for connecting round tubing. While either square or round tubing may be the most common shape of tubing, the use of a tubing connector with any shape arms for use with cooperating tubing, which connector utilizes a taper thread to expand finger portions of the arm, is intended to come within the scope of the present invention, and the outside cross-section of the arm does not necessarily need to match the inside cross-section of the tubing. For example, an arm having a hexagonal outside cross-section might be used with a round tubing. While the tubing connector of the present invention has been described as a combination of parts, the tubing connector also could be a single piece formed by casting, machining, or the like.

Figure 20:
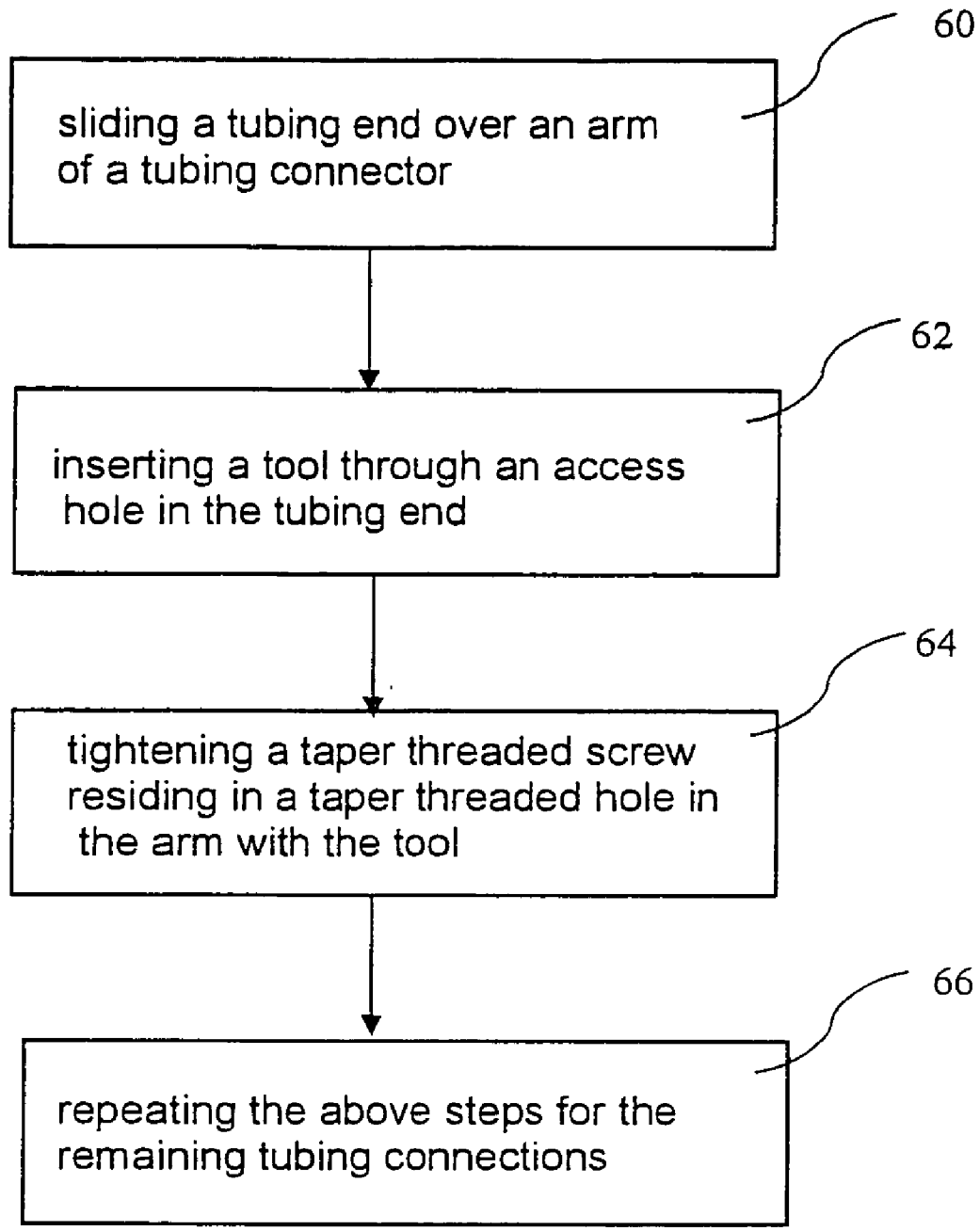
FIG. 20 depicts a method for building a structure using tubing and the tubing connector of the present invention.

A method of use of the tubing connector of present invention is depicted in FIG. 20. The method comprises sliding a tubing end over an arm of a tubing connector at step 60, inserting a tool through an access hole in the tubing end at step 62, tightening a taper threaded screw residing in a taper threaded hole in the arm with the tool at step 64, and repeating the above steps for the remaining tubing connections at 66.

While the invention herein disclosed has been described by means of specific embodiments and applications thereof, numerous modifications and variations could be made thereto by those skilled in the art without departing from the scope of the invention set forth in the claims.

I claim:

1. A releasable tubing connector comprising:
a corner piece; and
at least one arm attached to said corner piece at a proximal end of the arm, and extending away from said corner piece, and having a distal end opposite the proximal end, said arm having:
a central axis extending through the center of the arm and away from said corner piece;
a slice extending to the distal end of said arm and separating the distal end of said arm into a first finger portion and a second finger portion; and
a taper threaded hole centered on the slice,
wherein:
the arm is slideably engagable into an end of a length of tubing; and
a screw may be advanced into the taper threaded hole to spread the first finger portion of the arm from the second finger portion of the arm.

2. The connector of claim 1, wherein the taper threaded hole is a pipe threaded hole.

3. The connector of claim 1, wherein the screw is a taper threaded screw.

4. The connector of claim 1, wherein the screw is an allen screw.

5. The connector of claim 1, wherein the screw is a tamper resistant screw.

6. The connector of claim 1, wherein said tubing has an access hole, wherein when the tubing is positioned on the arm of the tubing connector, the access hole is substantially aligned with the taper threaded hole of the arm.

7. The connector of claim 1, wherein said tubing is square tubing and the arm has a substantially square cross-section slideably engagable into an end of said square tubing.

8. The connector of claim 7, wherein a difference between a tubing inside dimension and an arm outside dimension is between approximately 0.015 inches and approximately 0.025 inches.

9. The connector of claim 7, wherein a difference between a tubing inside dimension and an arm outside dimension is approximately 0.020 inches.

10. The connector of claim 1, wherein the at least one arm comprises at least two arms.

11. The connector of claim 1, wherein the at least one arm is between approximately 1.5 inches and approximately 2.5 inches long.

12. The connector of claim 1, wherein the at least one arm is approximately two inches long.

13. The connector of claim 1, wherein the at least one arm is between approximately 0.8 inches and approximately one inches across.

14. The connector of claim 1, wherein the at least one arm is attached to the corner piece by at least two pins.

15. The connector of claim 14, wherein the at least two pins are coiled spring pins.

16. The connector of claim 1, wherein the at least one arm has a substantially square cross section having beveled edges.

17. The connector of claim 1, wherein the at least one arm has faces including reliefs.

18. A structure comprising:
a multiplicity of tubing connectors comprising:
a corner piece; and
at least one arm attached to said corner piece at a proximal end of the arm, and extending away from said corner piece, and having a distal end opposite the proximal end, said arm having a central axis, and comprising:
a slice extending to the distal end of said arm and separating the distal end of said arm into a first finger portion and a second finger portion; and
a taper threaded hole approximately centered on the slice and approximately orthogonal to the central axis,
tubular members connected by the tubing connectors, wherein the tubular members have tubing ends residing on said arms and having access holes aligned with the taper threaded holes;
a screw residing in the taper threaded hole and spreading the first finger portion of the arm from the second finger portion of the arm to hold the tubing securely on the arm.

19. The connector of claim 18, wherein the taper threaded hole is a pipe threaded hole and the screw is a pipe threaded screw.

20. A method for assembling a tubular structure, the method comprising:
providing a corner piece having at least one arm, wherein the at least one arm is attached to said corner piece at a proximal end of the arm, and wherein the at least one arm extends away from said corner piece and has a distal end opposite the proximal end, said at least one arm having a central axis, and including: a slice extending to the distal end of the said at least one arm and separating the distal end of said at least one arm into a first finger portion and a second finger portion; and a taper threaded hole approximately centered on the slice and approximately orthogonal to the central axis; sliding a tubing end over the at least one arm; inserting a tool through an access hole in the tubing end; and tightening a taper threaded screw residing in the taper threaded hole in the arm with the tool to spread the finger portions apart to secure the tubing end on the at least one arm.

* * * * *